United States Patent
Cho et al.

(10) Patent No.: US 9,965,246 B2
(45) Date of Patent: May 8, 2018

(54) METHOD FOR OUTPUTTING SCREEN INFORMATION THROUGH SOUND AND ELECTRONIC DEVICE FOR SUPPORTING THE SAME

(71) Applicant: Samsung Electronics Co., Ltd., Suwon-si, Gyeonggi-do (KR)

(72) Inventors: Sung Jae Cho, Seoul (KR); Dong Heon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 14/851,603

(22) Filed: Sep. 11, 2015

(65) Prior Publication Data

US 2016/0077796 A1   Mar. 17, 2016

(30) Foreign Application Priority Data

Sep. 16, 2014  (KR) .................. 10-2014-0122950

(51) Int. Cl.
| | | |
|---|---|---|
| *G06F 15/00* | (2006.01) | |
| *G06F 13/00* | (2006.01) | |
| *G06F 3/16* | (2006.01) | |

(52) U.S. Cl.
CPC .................. *G06F 3/167* (2013.01)

(58) Field of Classification Search
CPC ....................................................... G06F 17/30

USPC ................... 715/763–765, 851–853
See application file for complete search history.

(56) References Cited

U.S. PATENT DOCUMENTS

| | | | |
|---|---|---|---|
| 2012/0093348 A1 | 4/2012 | Li | |
| 2013/0012268 A1 | 1/2013 | Whang | |
| 2013/0154930 A1* | 6/2013 | Xiang | ..................... G06F 3/167 |
| | | | 345/158 |
| 2014/0086422 A1* | 3/2014 | Huang | ................. H03G 3/3089 |
| | | | 381/57 |

FOREIGN PATENT DOCUMENTS

| | | |
|---|---|---|
| JP | 2007-52385 A | 3/2007 |
| KR | 10-2013-0004713 A | 1/2013 |

* cited by examiner

*Primary Examiner* — Kevin Nguyen
(74) *Attorney, Agent, or Firm* — Jefferson IP Law, LLP

(57) ABSTRACT

A method of outputting screen information using a sound, executed on an electronic device, is provided. The method includes creating a multi-dimensional space of two or more dimensions corresponding to a screen of the electronic device, setting sound information on respective coordinates of the multi-dimensional space, extracting location information of a focused point on the screen of the electronic device, determining coordinates of the multi-dimensional space corresponding to the location information, and outputting a sound according to the sound information set to the determined coordinates.

21 Claims, 7 Drawing Sheets

METHOD FOR OUTPUTTING SCREEN INFORMATION THROUGH SOUND AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Sep. 16, 2014 in the Korean Intellectual Property Office and assigned Serial number 10-2014-0122950, the entire disclosure of which is hereby incorporated by reference.

TECHNICAL FIELD

The present disclosure relates to technology of outputting screen information of an electronic device using a sound.

BACKGROUND

Electronic devices such as a smart phone and a tablet personal computer (PC) output an image, text, and the like using a screen, and a user executes various functions (e.g., web search, listening to music, and the like) based on outputted contents. An electronic device may provide a service of sequentially outputting contents displayed on the screen through a voice for the user (e.g., a blind person), which does not check the display contents, as well as the general public.

Since contents displayed on the screen of an electronic device are sequentially outputted to a user through a sound, the user may perceive contents which are one-dimensionally arranged and are different from contents actually displayed on the screen. In this case, a difference occurs between the contents, which are displayed on the screen, and the contents, which the user recognizes, thereby making it difficult for the user to perceive and control the screen effectively.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for outputting a multi-dimensional spatial sound by making a screen of an electronic device correspond to a multi-dimensional sound space.

Another aspect of the present disclosure is to transmit, to a user, a sound of which the intensity or frequency varies according to a focused target.

Another aspect of the present disclosure is to output a sound which is distinguishable according to an attribute of a focused target.

In accordance with an aspect of the present disclosure, a method of outputting screen information using a sound, executed on an electronic device is provided. The method includes creating a multi-dimensional space corresponding to a screen of the electronic device, setting sound information on respective coordinates of the multi-dimensional space, extracting location information of a focused point on the screen of the electronic device, determining coordinates of the multi-dimensional space corresponding to the location information, and outputting a sound according to the sound information set to the determined coordinates.

In accordance with an aspect of the present disclosure, an electronic device is provided. The electronic device includes a sound setting module configured to create a multi-dimensional space corresponding to a screen of the electronic device, and to set sound information on respective coordinates of a corresponding space, a location information extraction module configured to extract location information of a focused point on the screen of the electronic device, a coordinate determining module configured to determine coordinates of the multi-dimensional space corresponding to the location information, and a sound outputting module configured to output a sound according to the sound information set to the determined coordinates.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
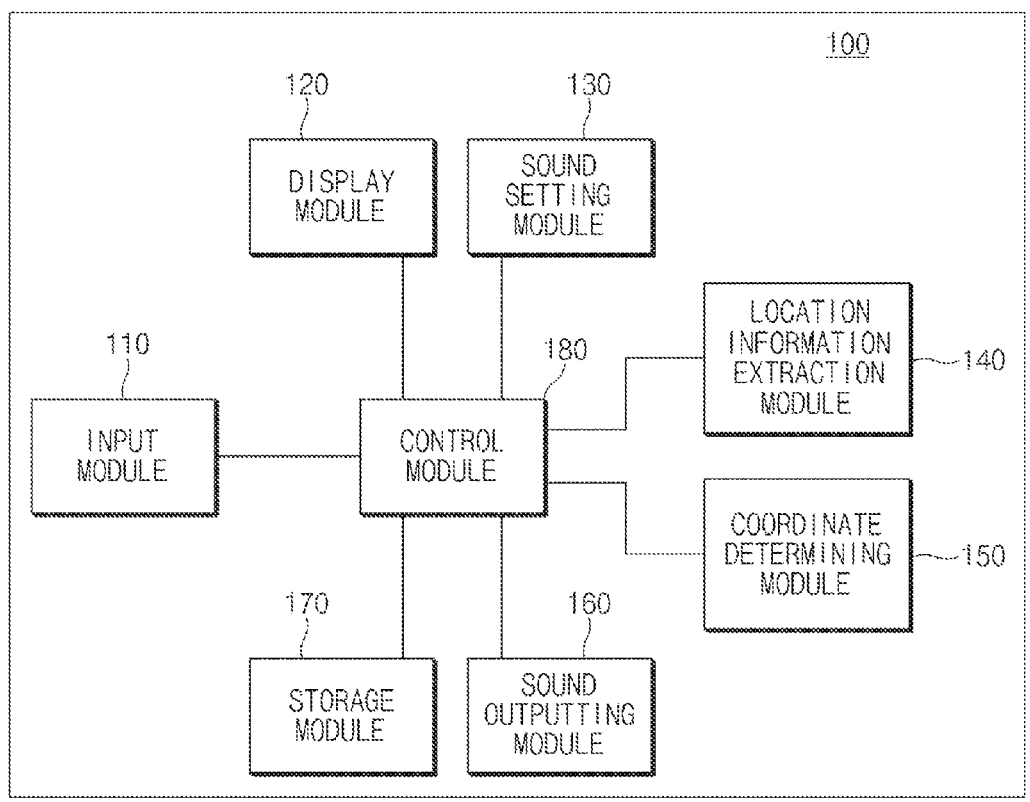
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

The meaning of the term "or" or "at least one of A and/or B" used herein includes any combination of words listed together with the term. For example, the expression "A or B" or "at least one of A and/or B" may indicate A, B, or both A and B.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

In the description below, when one part (or element, device, etc.) is referred to as being "connected" to another part (or element, device, etc.), it should be understood that the former may be "directly connected" to the latter, or "electrically connected" to the latter via an intervening part (or element, device, etc.). It will be further understood that when one component is referred to as being "directly connected" or "directly linked" to another component, it means that no intervening component is present.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

Electronic devices according to various embodiments of the present disclosure may include an electronic device having a sound output function. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), moving picture experts group phase 1 or phase 2 (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances including a sound output function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, and the like.

According to various embodiments of the present disclosure, the electronic devices may include at least one of the following devices having a sound output function: medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs).

According to various embodiments of the present disclosure, the electronic devices may include at least one of parts of furniture or buildings/structures having communication functions, electronic boards, electronic signature receiving devices, projectors, and measuring instruments (e.g., water meters, electricity meters, gas meters, and wave meters), each of which includes a sound output function. The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram of an electronic device according to various embodiments of the present disclosure.

Referring to FIG. 1, an electronic device 100 may include an input module 110, a display module 120, a sound setting module 130, a location information extraction module 140, a coordinate determining module 150, a sound outputting module 160, a storage module 170, and a control module 180. The modules may be independent of each other based on their functions. However, the scope and spirit of the present disclosure may not be limited thereto. The modules may be implemented in a chip so as to be separated by software or hardware. For example, the sound setting module 130, the location information extraction module 140, and the coordinate determining module 150 may be implemented in the form of a module performing an integrated function.

The input module 110 may generate an operating signal for operating an electronic device 100 in response to an input from an outside of the electronic device 100 and may provide the operating signal to the control module 180. The input module 110 may include input devices such as key buttons, a keyboard, a keypad, a touch pad, a touch screen, and the like. If implemented with a touch screen, the input module 110 may generate an operating signal which corresponds to a left/right sweep (e.g., drag, flick, or swipe), an up/down sweep, a tap and the like.

The display module 120 may display an execution screen which operates according to a control of the control module 180. The display module 120 may include a liquid crystal display (LCD), a touch screen and the like. If implemented with a touch screen, the display module 120 may perform a role of the input module 110, and the display module 120 may generate a touch signal according to a touch event of a user and may provide the touch signal to the control module 180. The display module 120 may display a focused point (e.g., a point indicated by a cursor or a point distinguishable with a color or a shape different from surrounding icons) on a screen. A target indicated by the focused point may be an icon, text, an image and the like. According to various embodiments of the present disclosure, information associated with the target indicated by the focused point may be outputted through a sound.

The sound setting module 130 may create a virtual multi-dimensional space corresponding to the screen of the electronic device 100 and may set sound information on respective coordinates of the multi-dimensional space. Here, the multi-dimensional space may be a virtual space in which associated sound information is set for each of coordinates. The sound setting module 130 may allow the user such as a blind person to perceive a screen configuration or screen contents of the electronic device 100 through the virtual multi-dimensional space. If a sound is outputted by the set sound information, the user may understand the screen contents of the electronic device 100 as icon or text placement on the multi-dimensional space through the sound.

The location information extraction module 140 may extract location information of a focused point displayed on the screen of the electronic device 100 and may provide the location information to the control module 180. According to various embodiments of the present disclosure, the location information may be coordinate information on a specific point of the display module 120 under the condition that the total size of the display module 120 is used as a reference. For example, in the case where the total size of the display module 120 is 9 cm by 16 cm, the location information extraction module 140 may determine that a currently focused point is (6.3 cm, 8.5 cm).

According to various embodiments of the present disclosure, the location information may be relative location correlation information among icons placed on the display module 120. For example, in the case where icons are placed on the display module 120 in a 4-by-4 matrix, the location information may be placement information such as (4, 1) indicating that a specific icon is placed at the fourth row and first column. Furthermore, the location information may correspond to absolute icon placement information in the display module 120. For example, the location information may be placement information such as (6.5 cm, 8.5 cm) indicating a location where a specific icon is placed. The location information may be used to output a sound for the user such as a blind person.

The coordinate determining module 150 may convert location information extracted by the location information extraction module 140 into coordinates on the multi-dimensional space for outputting of a sound. In the case where a focused point is included within a specific range or indicates a specific target (e.g., an icon or a text), the coordinate determining module 150 may determine a coordinate value on the multi-dimensional space corresponding to the range or target.

The sound outputting module 160 may output a sound by sound information set by the sound setting module 130. The sound outputting module 160 may be connected to an internal speaker of the electronic device 100 or an earphone. Furthermore, the sound outputting module 160 may be connected to an accessary such as a flip cover including a speaker device. According to various embodiments of the present disclosure, the sound outputting module 160 may be connected to a plurality of speakers. The speakers may be set to output different sounds and thus may allow the user to three-dimensionally perceive contents displayed on the screen of the electronic device 100 by virtue of sounds outputted through the speakers. For example, the sound outputting module 160 may output different intensities of sounds to left and right speakers or left and right earphones. The sound outputting module 160 may set the output intensity of the left speaker to be greater than that of the right speaker, with respect to keys 1, 4, and 7 placed on the left with the screen as the center, and the sound outputting module 160 may set the output intensity of the right speaker to be greater than that of the left speaker, with respect to keys 3, 6, and 9 placed on the right with the screen as the center.

The storage module 170 may store multi-dimensional space information which is generated by the sound setting module 130. For example, the storage module 170 may store the total size of a virtual multi-dimensional space, a configuration manner, and coordinate information corresponding to the screen of the electronic device 100. Furthermore, the storage module 170 may store sound information set to respective coordinates of the multi-dimensional space. For example, the storage module 170 may store coordinate information and sound information if a 10-dB, 20-Hz sound is set with respect to the coordinates (1, 1) of the multi-dimensional space.

The control module 180 may control operations and data flows of the input module 110, the display module 120, the sound setting module 130, the location information extraction module 140, the coordinate determining module 150, the sound outputting module 160, and the storage module 170. The control module 180 may provide the storage module 170 with information of the multi-dimensional space generated by the sound setting module 130. The control module 180 may receive coordinates on the multi-dimensional space determined by the coordinate determining module 150 and may provide sound information, corresponding to the received coordinates on the multi-dimensional space, to the sound outputting module 160.

According to various embodiments of the present disclosure, an electronic device may include a sound setting module configured to generate a multi-dimensional space corresponding to a screen of the electronic device and to set sound information on respective coordinates of a corresponding space, a location information extraction module configured to extract location information of a focused point on the screen of the electronic device, a coordinate determining module configured to determine coordinates of the multi-dimensional space corresponding to the location information, and a sound outputting module configured to output a sound according to the sound information set to the determined coordinates. According to an embodiment of the present disclosure, the sound information comprises information perceived as one among various situations according to a relative distance between a specific point on the multi-dimensional space and the coordinates of the multi-dimensional space.

According to various embodiments of the present disclosure, the sound setting module may set sound information, which differentiates according to a relative distance between a specific point on the multi-dimensional space and the coordinates of the multi-dimensional space, to the respective coordinates using a pattern of a frequency change occurring at both ears of a user.

According to various embodiments of the present disclosure, the sound setting module may create the multi-dimensional space based on an intensity or a frequency of a sound and may assign sounds in which at least one of an intensity or a frequency is variable, to the respective coordinates. The sound setting module may differently set an intensity or a frequency of a sound, which is changed while the sound is outputted, according to the coordinates of the multi-dimensional space.

According to various embodiments of the present disclosure, the sound setting module may expand the screen of the electronic device up to a virtual space range set by a user. The sound setting module may set a sound preamble of a same characteristic to at least one of rows or columns in the multi-dimensional space. The sound setting module may perform assignment to include number information of the coordinates in the sound information. The sound setting module may change a tone of sound and assigning the changed tone to the respective coordinates.

Figure 2:
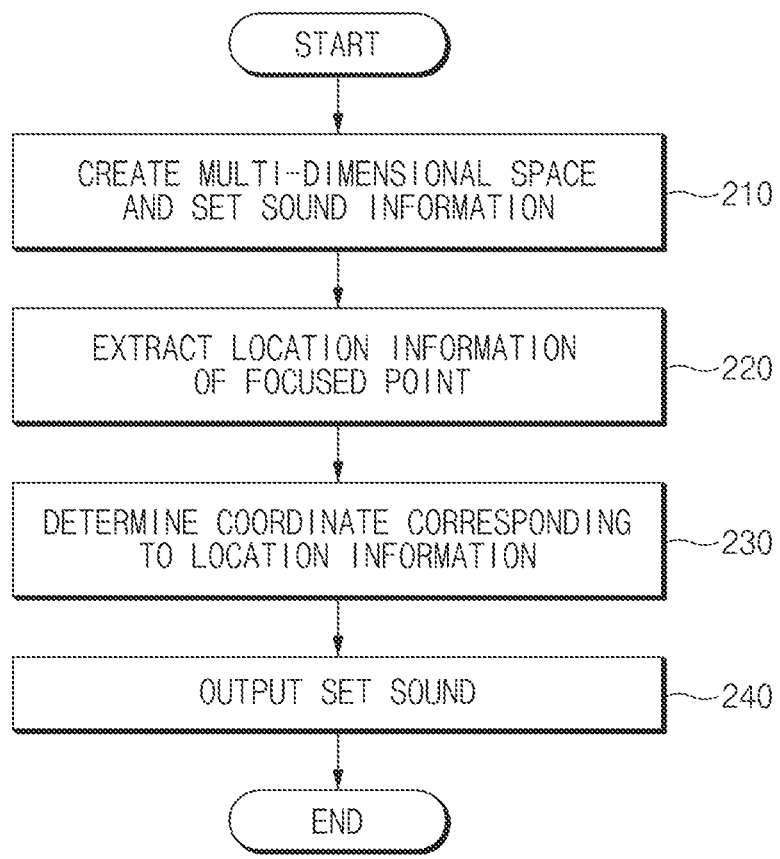
FIG. 2 is a flow chart schematically illustrating a method of outputting screen information through a sound according to various embodiments of the present disclosure.

FIG. 2 is a flow chart schematically illustrating a method of outputting screen information through a sound according to various embodiments of the present disclosure.

Referring to FIG. 2, in operation 210, the sound setting module 130 may separately create a multi-dimensional space corresponding to a screen of an electronic device 100 and may set sound information on respective coordinates of the multi-dimensional space. The sound setting module 130 may allow a user such as a blind person to perceive screen configuration or screen contents of the electronic device through the multi-dimensional space.

According to an embodiment of the present disclosure, in the case where the display module 120 is implemented in the form of a two-dimensional plane, the sound setting module 130 may create a virtual multi-dimensional space by extending the two-dimensional plane. The degree of extension of the screen may be determined by a value previously set or by a value set by the user. According to another embodiment of the present disclosure, the sound setting module 130 may implement a two-dimensional icon placement of the display module 120 at a space of two or more dimensions (hereinafter referred to as a "multi-dimensional space"), thereby making it possible for the user to perceive a user interface (UI) or user experience (UX), displayed on the display module 120, using a sound.

In operation 220, the location information extraction module 140 may extract location information of a focused point displayed on the screen of the electronic device 100 and may provide the extracted location information to the control module 180. The location information may be coordinate information in which the total size of the display module is used as a reference. The location information may be used to output a sound for a user such as a blind person.

In operation 230, the coordinate determining module 150 may determine coordinates corresponding to the multi-dimensional space for outputting of a sound, based on the location information extracted by the location information extraction module 140. In the case where the focused point is included within a specific range or indicates a specific target (e.g., an icon or a text), the coordinate determining module 150 may determine a coordinate value on the multi-dimensional space corresponding to the range or the target.

In operation 240, the sound outputting module 160 may output a sound by sound information which is set to coordinates on the multi-dimensional space. For example, in the case where the coordinates (1, 1) in a two-dimensional coordinate space of which the total size is 4 by 4 are determined by the coordinate determining module 150, the sound outputting module 160 may output a sound which has specific intensity and frequency set to the coordinates (1, 1).

Figure 3A:
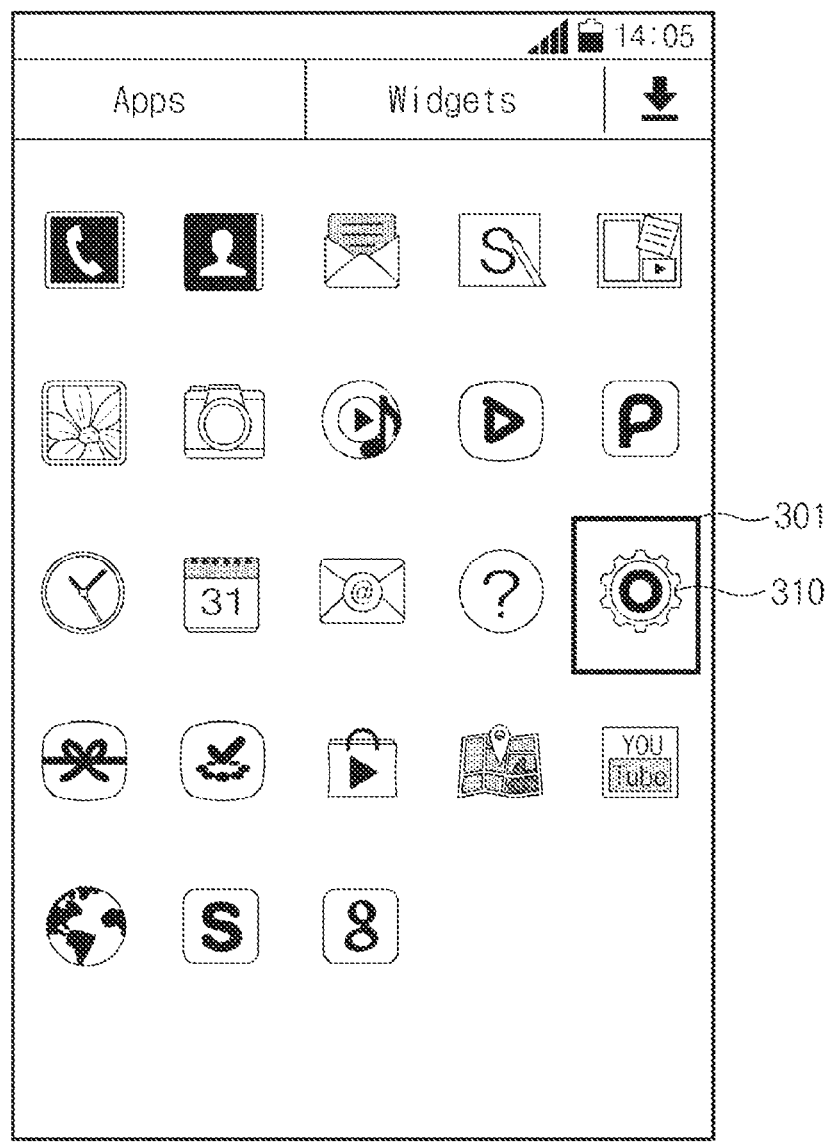
FIG. 3A is a diagram schematically illustrating an icon screen according to various embodiments of the present disclosure.

FIG. 3A is a diagram schematically illustrating an icon screen according to various embodiments of the present disclosure.

Referring to FIG. 3A, the sound setting module 130 may make two-dimensional space, at which icons are able to be placed and may set sound information with respect to coordinates of the two-dimensional space. The sound setting module 130 may allow a user such as a blind person to perceive screen configuration or screen contents through the two-dimensional space to which a sound is set.

The location information extraction module 140 may extract location information of an icon indicated by a focused point 301 and may provide the extracted location information to the control module 180. For example, the location information extraction module 140 may detect information that a setting icon 310 at which the currently focused point 301 is placed is placed at the third row and fifth column, in the form of (3, 5) and may provide the detected information to the control module 180.

A sound outputting module 160 may provide a user with information associated with the focused icon using a sound according to sound information. The user may determine a location and an attribute of a target indicated by the focused point 301, based on the outputted sound. For FIG. 3A, the sound outputting module 160 may output information "settings" associated with the setting icon 310 in a voice.

Figure 3B:
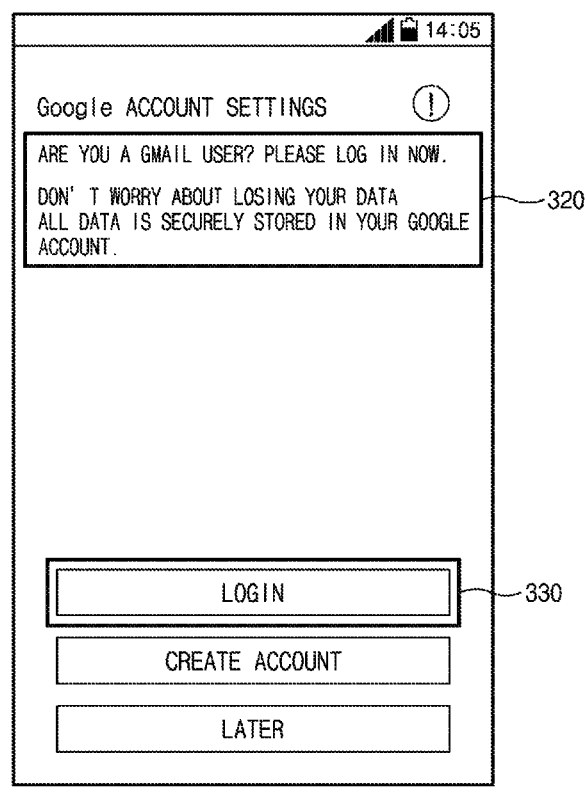
FIG. 3B is a diagram schematically illustrating a text screen according to various embodiments of the present disclosure.

FIG. 3B is a diagram schematically illustrating a text screen according to various embodiments of the present disclosure.

Referring to FIG. 3B, the sound setting module 130 may set sound information which is variable according to an attribute of text that is included in a point indicated by a cursor or capable of being focused on a screen. The text may include a simple information text 320 or an operating text 330 used to execute an operation appointed by a user touch. For example, in the case of the information text 320 in which an operation is not additionally executed by a user touch, the sound setting module 130 may set sound information by a first frequency previously set. Also, in the case of the operating text 330 in which an operation is additionally executed by a user touch, the sound setting module 130 may set sound information by a second frequency different from the first frequency. As another example, the sound setting module 130 may set sound information by a first intensity to the information text 320 and may set sound information by a second intensity to the operating text 330.

Figure 4:
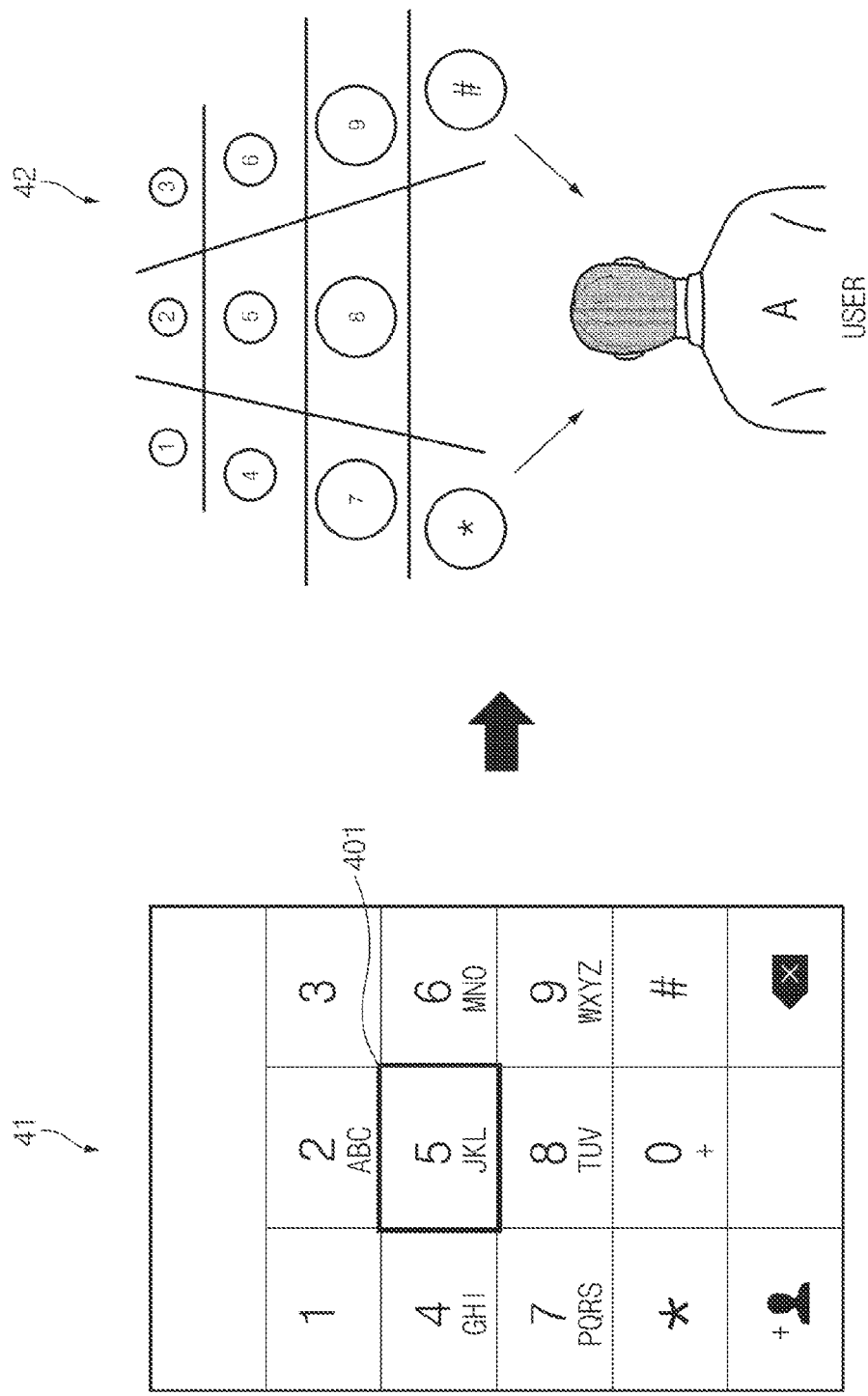
FIG. 4 is a diagram for describing matching between a screen and a virtual space according to various embodiments of the present disclosure.

FIG. 4 is a diagram for describing matching between a screen and a virtual space according to various embodiments of the present disclosure. In FIG. 4, an embodiment of the present disclosure is exemplified as a virtual two-dimensional space is created. However, the scope and spirit of the present disclosure may not be limited thereto.

Referring to FIG. 4, a screen 41 is an exemplification of a keypad screen of the electronic device 100. In the screen 41, the display module 120 may display a two-dimensional keypad. A focused point 401 may be placed at a specific key (e.g., key 5) of a screen. If receiving a left/right move instruction (e.g., a left sweep or a right sweep) of a user, the electronic device 100 may provide the user with a service in which contents of the keypad are sequentially read according to the left/right move instruction. For example, the electronic device 100 may read and output "6" in the case where a right sweep operation of the user is received when a focused point 401 is currently placed at key 5; in contrast, the electronic device 100 may read and output "4" in the case where a left sweep operation of the user is received when the focused point 401 is currently placed at key 5.

A virtual space 42 may be an exemplification of a virtual space which the user perceives through a sound. In the virtual space 42, a sound setting module 130 may separately create a two-dimensional space corresponding to the keypad screen 41 and may set sound information with respect to respective coordinates of the two-dimensional space. The sound setting module 130 may allow the user such as a blind person to perceive a screen configuration or screen contents of the electronic device 100 through the two-dimensional space.

According to various embodiments of the present disclosure, the sound setting module 130 may set sound information which is variable according to a relative distance between a specific point (e.g., a point at which key 0 is placed) on a multi-dimensional space and respective coordinates. The sound setting module 130 may set sound information so as to be perceived as any one of various situations based on the distance. For example, the sound setting module 130 may set sound information of respective coordinates of the two-dimensional space using binaural technology. The binaural technology may allow a listener to perceive as if the listener is in a specific situation, in the case where the listener hears a set sound even though not in the specific situation.

The binaural technology may be implemented so as to finely record a sound, generated in a specific situation, through recording or synthesizing and then to reproduce the sound.

The binaural technology may include binaural recording in which a signal is recorded in a specific situation, binaural synthesis in which artificial signals on the specific situation are synthesized, and binaural reproduction in which the recorded or synthesized signals are reproduced at both ears.

The binaural recording may be performed using an "artificial head" (or a dummy head). The artificial head may be a model head which is manufactured using a mean value of psycho acoustic of the general public.

The binaural synthesis may be performed by synthesizing sounds transmitted to two ears from a point. Sound synthesis may be performed based on head-related transfer function (HRTF). The HRTF may be a function of arranging the frequency fluctuations occurring at two ears, with a head interposed therebetween. The HRTF may include contents arranged as a three-dimensional function which is obtained by setting spherical coordinates with his/her head as the center and measuring a response of a frequency which a person perceives in the case of generating the same sound at respective coordinates. Sound synthesis may be performed based on a standard HRTF which is obtained by measuring HRTF of a plurality of persons and calculating a mean value of measured data.

Binaural reproduction may be performed by reproducing recorded or synthesized signals using a headphone or a speaker. Binaural reproduction may improve location estimation ability by using a "head tracker" capable of interactively updating a location of a sound source based on a direction and a location of a listener.

The sound setting module 130 may set sound information, which is previously recorded or synthesized by the binaural technology, to respective coordinates of a two-dimensional space. For example, the sound setting module 130 may set previously recorded or synthesized long-distance sound information to keys 1 to 3 which are in a long distance from point A on a virtual space corresponding to a location of the user and may set previously recorded or synthesized short-distance sound information to keys 7 to 9 which are in a short distance from point A, thereby making it possible for the user to perceive a location of each key.

Also, the sound setting module 130 may adjust the intensities of sounds outputted from left and right speakers or left and right earphones and may set sound information from the left with respect to keys 1, 4, and 7 placed at the left of the user and sound information from the right with respect to keys 3, 6, and 9 placed at the right of the user. The sound setting module 130 may set sound information between keys 1 and 3 with respect to key 2 and may set sound information in a manner similar to key 2, with respect to keys 5 and 8.

A user may perceive a screen structure of the electronic device 100, based on sound information set by the sound setting module 130. The user may move a currently focused point 401 into another point through an up/down move instruction as well as a left/right move instruction. For example, in the case where a location of the currently focused point 401 is placed at key 5, the user may move the focused point 401 into key 2 through an up sweep and may move the focused point 401 into key 8 through a down sweep.

According to the related art, the user may perform a left sweep operation three times to move a focused point 401 from key 5 to key 8. In contrast, according to various embodiments of the present disclosure, the user may perform a down sweep operation once to directly move the focused point 401 from key 5 to key 8.

According to an embodiment of the present disclosure, based on HRTF selected by a user, the sound setting module 130 may set specific sound information, which is determined according to a relative distance between coordinates of a multi-dimensional space and a point (point A) on a virtual space corresponding to a location of the user. The sense of space may be different for a person; hence, if one directly selects HRTF fit to oneself, the sound setting module 130 may set sound information using the selected HRTF.

Figure 5:
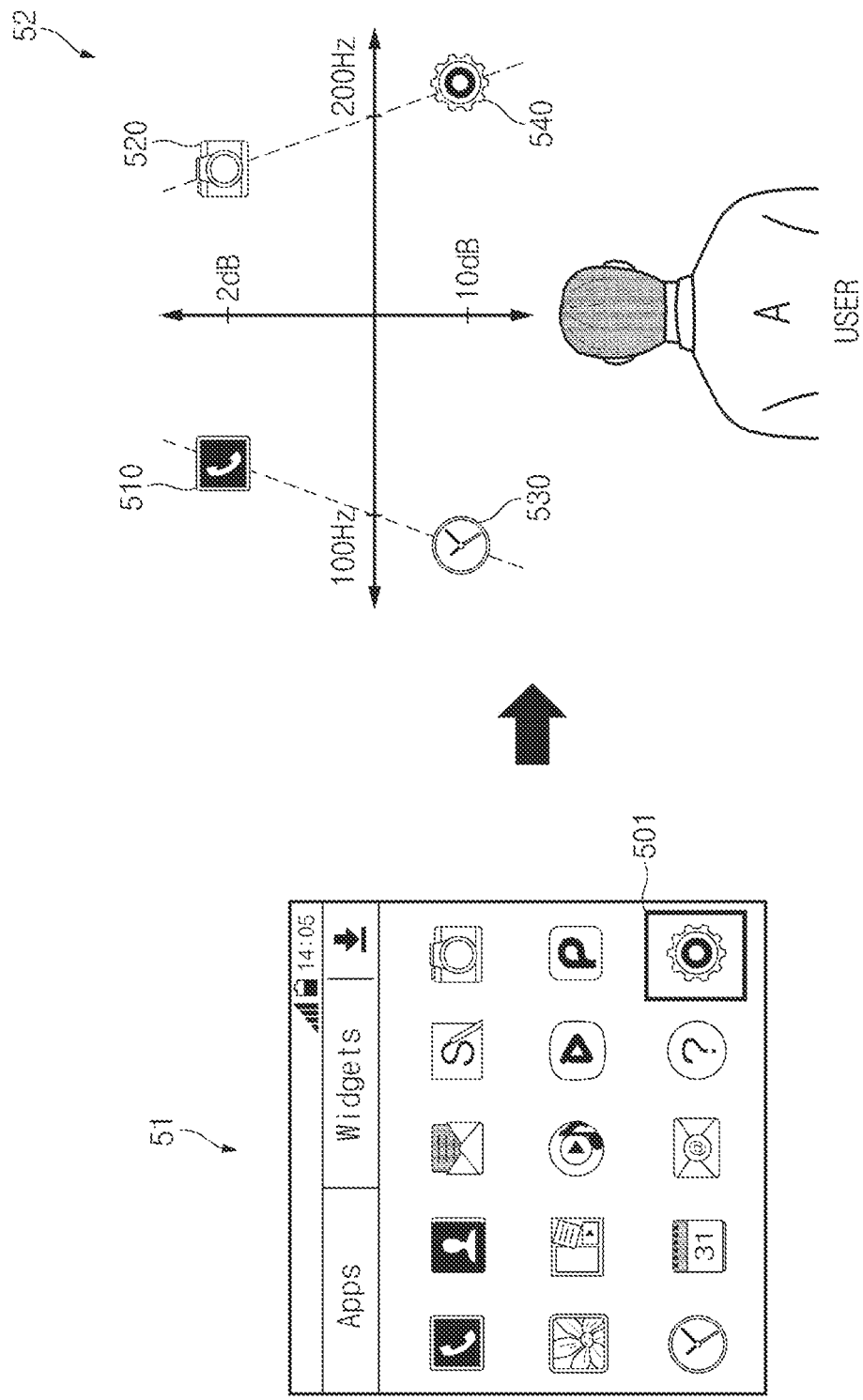
FIG. 5 is a diagram for describing setting of a sound through an intensity or frequency of a sound according to various embodiments of the present disclosure.

FIG. 5 is a diagram for describing setting of a sound through a sound intensity or frequency according to various embodiments of the present disclosure. In FIG. 5, an embodiment of the present disclosure is exemplified as a two-dimensional space is created. However, the scope and spirit of the present disclosure may not be limited thereto.

Referring to FIG. 5, a screen 51 may be an exemplification of an icon screen of the electronic device 100. In the screen 51, the display module 120 may display an icon screen (two-dimension). A focused point 501 may be placed on a specific icon (e.g., a setting icon). A sound setting module 130 may create a two-dimensional space corresponding to the icon screen and may set sound information with respect to respective coordinates of the two-dimensional space. The sound setting module 130 may allow a user such as a blind person to perceive a screen configuration or screen contents of the electronic device 100 through the two-dimensional space.

A virtual space 52 may be an exemplification of a virtual space which the user perceives through a sound. In the virtual space 52, the sound setting module 130 may set sound information with respect to coordinates of the three-dimensional space, based on the intensity (dB) or frequency (Hz) of a sound.

The sound setting module 130 may set sound information of a weak intensity with respect to an icon which is in a long distance from a location (e.g., point A) of the user and may set sound information of a strong intensity with respect to an icon which is in a short distance from the location (point A) of the user. Also, the sound setting module 130 may set sound information of a low frequency with respect to an icon (e.g., a call icon or a clock icon) placed at the left of the location (point A) of the user and may set sound information of a high frequency with respect to an icon (e.g., a camera icon or a setting icon) placed at the right of the location (point A) of the user.

For example, the sound setting module 130 may set a sound signal (e.g., 2 dB, 100 Hz), which has the weakest intensity and the lowest frequency, in a setting range to a call icon 510 placed at the top left of the screen of the electronic device 100. The sound setting module 130 may set a sound signal (e.g., 2 dB, 200 Hz), which has the weakest intensity and the highest frequency, in the setting range to a camera icon 520 placed at the top right of the screen of the electronic device 100.

Furthermore, the sound setting module 130 may set a sound signal (e.g., 10 dB, 100 Hz), which has the most strong intensity and the lowest frequency, in the setting range to a clock icon 530 placed at the bottom left of the screen of the electronic device 100. The sound setting module 130 may set a sound signal (e.g., 10 dB, 200 Hz), which has the most strong intensity and the highest frequency, in the setting range to a setting icon 540 placed at the bottom right of the screen of the electronic device 100.

According to an embodiment of the present disclosure, the sound setting module 130 may set sound information by applying intensity, a frequency or a time component of a sound. For example, in the case of the call icon 510 which is in a long distance from a user, the sound setting module 130 may set intensity of a sound low at a start point in time of a sound and may set the intensity of the sound higher than at the start point in time of the sound. A user may feel the sense of space as if a sound is increasingly approaching. Also, for the clock icon 530 which is placed in a relatively short distance from the user, the sound setting module 130 may set the intensity of the sound higher than for the call icon 510 and may set duration of the sound relatively shortly. The user may perceive the sound as being generated at a distance adjacent to him/her.

According to an embodiment of the present disclosure, the sound setting module 130 may create a sound space to which intensity, a frequency, or a reproduction time is applied. For example, the sound setting module 130 may set a reproduction time to 2 seconds for the call icon 510 and to 1 second for the clock icon 530.

According to an embodiment of the present disclosure, the sound setting module 130 may apply a tone and may set sound information. For example, the sound setting module 130 may set a man's voice to the call icon 510 and the clock icon 530 placed at the left from the user and may set a woman's voice to the camera icon 520 and the setting icon 540 placed at the right from the user.

According to an embodiment of the present disclosure, the sound setting module 130 may include number information of coordinates on a virtual space, at which an icon is placed, in sound information. For example, the sound setting module 130 may perform setting to output "1.1 call" if the call icon 510 of which the coordinates are (1, 1) is selected.

According to an embodiment of the present disclosure, the sound setting module 130 may assign a sound preamble of the same characteristic every at least one of rows and columns on a virtual space at which icons are placed. For example, the sound setting module 130 may set a first sound preamble to the call icon 510 and the camera icon 520 which are placed at the same row on the virtual space and may set a second sound preamble to the clock icon 530 and the setting icon 540 placed at another row. The user may perceive icon placement on the virtual space through a start sound.

According to various embodiments of the present disclosure, a method of outputting screen information using a sound, executed on an electronic device, is provided. The method may include creating a multi-dimensional space corresponding to a screen of the electronic device, setting sound information on respective coordinates of the multi-dimensional space, extracting location information of a focused point on the screen of the electronic device, determining coordinates of the multi-dimensional space corresponding to the location information, and outputting a sound according to the sound information set to the determined coordinates. The sound information may include information perceived as one among various situations according to a relative distance between a specific point on the multi-dimensional space and the coordinates of the multi-dimensional space.

According to various embodiments of the present disclosure, the setting of the sound information may include setting sound information, which differentiates according to a relative distance between a specific point on the multi-dimensional space and the determined coordinates, to the respective coordinates using a pattern of a frequency change occurring at both ears of a user.

According to various embodiments of the present disclosure, the setting of the sound information may include creating the multi-dimensional space based on an intensity or a frequency of a sound, and assigning sounds in which at least one of an intensity or a frequency is variable, to the respective coordinates. The assigning of the sounds may further include differently setting an intensity or a frequency of a sound, which is changed while the sound is outputted, according to the coordinates of the multi-dimensional space.

According to various embodiments of the present disclosure, the method may further include extracting an attribute of a target focused on the screen. The method may further include setting sound information according to the extracted attribute of the target.

According to various embodiments of the present disclosure, the creating of the multi-dimensional space may include expanding the screen of the electronic device up to a virtual space range set by a user. The setting of the sound information may include setting a sound preamble of a same characteristic to at least one of rows or columns in the multi-dimensional space. The setting of the sound information may include assigning to include number information of the coordinates in the sound information. The setting of the sound information may further include changing a tone of sound and assigning the changed tone to the respective coordinates.

Figure 6:
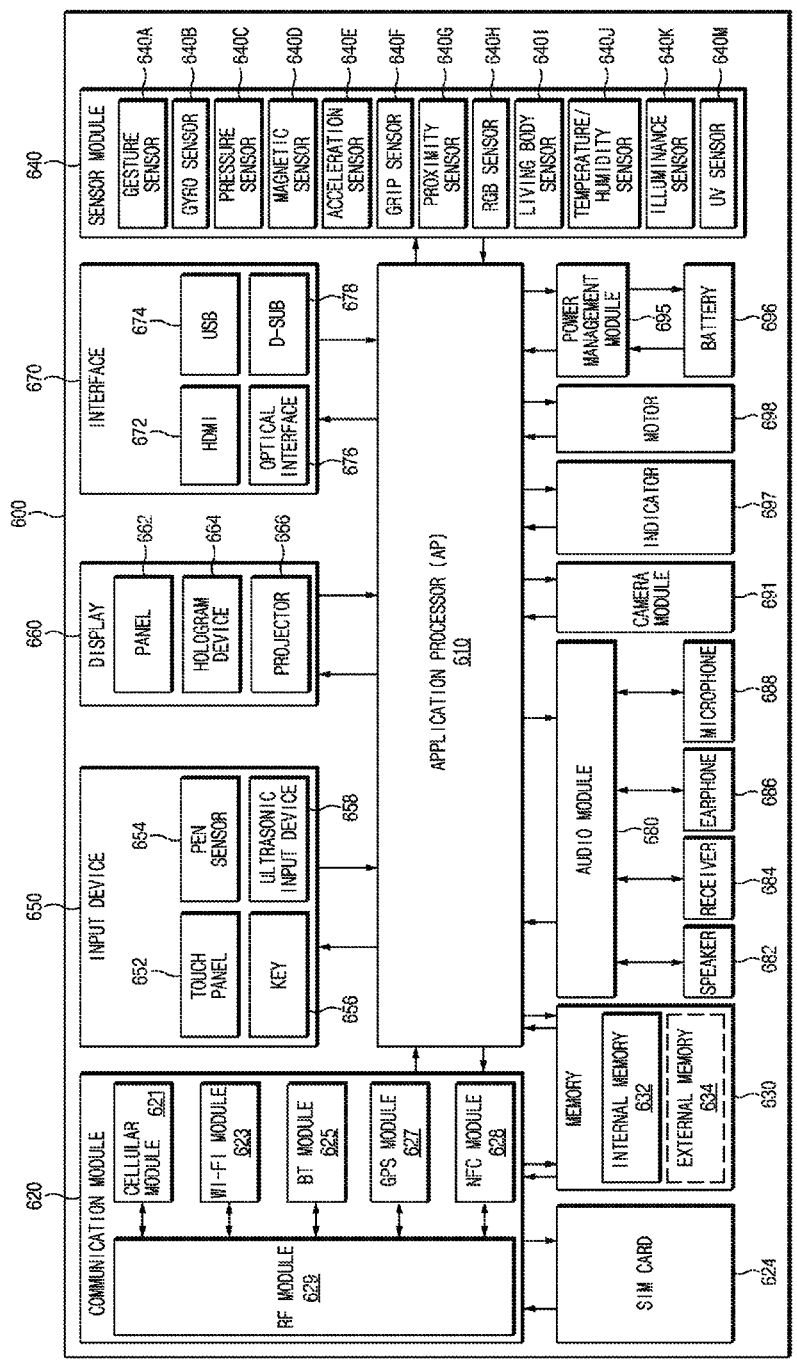
FIG. 6 is a block diagram illustrating an electronic device according to various embodiments of the present disclosure.

FIG. 6 is a block diagram illustrating an electronic device according to various embodiments of the present disclosure. The electronic device may include all or a part of an electronic device 100 illustrated in FIG. 1.

Referring to FIG. 6, an electronic device 600 may include one or more application processors (APs) 610, a communication module 620, a subscriber identification module (SIM) card 624, a memory 630, a sensor module 640, an input device 650, a display 660, an interface 670, an audio module 680, a camera module 691, a power management module 695, a battery 696, an indicator 697, and a motor 698.

The AP 610 (e.g., the control module 180) may drive an operating system (OS) or an application to control a plurality of hardware or software components connected to the AP 610 and may process and compute a variety of data including multimedia data. The AP 610 may be implemented with a system on chip (SoC), for example. According to an embodiment of the present disclosure, the AP 610 may further include a graphics processing unit (GPU) (not illustrated).

According to various embodiments of the present disclosure, the AP 610 may include at least one of a sound outputting module 130, a location information extraction module 140, or a coordinate determining module 150 which are illustrated in FIG. 1. The AP 610 may separately create a multi-dimensional space corresponding to a screen of the electronic device 600 and may set sound information on respective coordinates of a corresponding space. The AP 610 may extract location information of a focused point displayed on a screen. The AP 610 may determine the location information of the focused point as coordinates on the multi-dimensional space for outputting of a sound.

The communication module 620 may transmit and receive data when there are conveyed communications between other electronic devices connected with the electronic device 600 through a network. According to an embodiment of the present disclosure, the communication module 620 may include a cellular module 621, a Wi-Fi module 623, a Bluetooth (BT) module 625, a GPS module 627, a near field communication (NFC) module 628, and a radio frequency (RF) module 629.

The cellular module 621 may provide voice communication, video communication, a character service, an Internet service and the like through a communication network (e.g., a long term evolution (LTE), an LTE-advanced (LTE-A), a code division multiple access (CDMA), a wideband CDMA (WCDMA), a universal mobile telecommunications service (UMTS), a wireless broadband (WiBro), a global system for mobile communications (GSM), and the like). Also, the cellular module 621 may perform discrimination and authentication of an electronic device within a communication network using a SIM (e.g., the SIM card 624), for example. According to an embodiment of the present disclosure, the cellular module 621 may perform at least a portion of functions that the AP 610 provides. For example, the cellular module 621 may perform at least a portion of a multimedia control function.

According to an embodiment of the present disclosure, the cellular module 621 may include a communication processor (CP). Also, the cellular module 621 may be implemented with, for example, an SoC. Although components such as the cellular module 621 (e.g., a CP), the memory 630, the power management module 695, and the like are illustrated as being components independent of the AP 610, the AP 610 may be implemented to include at least a portion (e.g., a cellular module 621) of the above components.

According to an embodiment of the present disclosure, the AP 610 or the cellular module 621 (e.g., a CP) may load and process an instruction or data received from nonvolatile memories respectively connected thereto or from at least one of other elements at the nonvolatile memory. Also, the AP 610 or the cellular module 621 may store data received from at least one of other elements or generated by at least one of other elements at a nonvolatile memory.

Each of the Wi-Fi module 623, the BT module 625, the GPS module 627, and the NFC module 628 may include a processor for processing data exchanged through a corresponding module, for example. In FIG. 6, an embodiment of the present disclosure is exemplified in which the cellular module 621, the Wi-Fi module 623, the BT module 625, the GPS module 627, and the NFC module 628 are separate blocks, respectively. According to an embodiment of the present disclosure, at least a portion (e.g., two or more components) of the cellular module 621, the Wi-Fi module 623, the BT module 625, the GPS module 627, and the NFC module 628 may be included within one integrated circuit (IC) or an IC package. For example, at least a portion (e.g., a CP corresponding to the cellular module 621 and a Wi-Fi processor corresponding to the Wi-Fi module 623) of CPs corresponding to the cellular module 621, the Wi-Fi module 623, the BT module 625, the GPS module 627, and the NFC module 628 may be implemented with one SoC.

The RF module 629 may transmit and receive data, for example, an RF signal. Although not illustrated, the RF module 629 may include a transceiver, a power amplifier module (PAM), a frequency filter, or low noise amplifier (LNA). Also, the RF module 629 may further include the following part for transmitting and receiving an electromagnetic wave in a space in wireless communication: a conductor or a conducting wire. In FIG. 6, an embodiment of the present disclosure is exemplified in which the cellular module 621, the Wi-Fi module 623, the BT module 625, the GPS module 627, and the NFC module 628 are implemented to share one RF module 629. According to an embodiment of the present disclosure, at least one of the cellular module 621, the Wi-Fi module 623, the BT module 625, the GPS module 627, or the NFC module 628 may transmit and receive an RF signal through a separate RF module.

The SIM card 624 may be a card that includes a SIM and may be inserted to a slot formed at a specific position of the electronic device. The SIM card 624 may include unique identify information (e.g., IC card identifier (ICCID)) or subscriber information (e.g., integrated mobile subscriber identity (IMSI)).

The memory 630 (e.g., the storage module 170) may include an embedded memory 632 or an external memory 634. For example, the embedded memory 632 may include at least one of a volatile memory (e.g., a dynamic random access memory (DRAM), a static RAM (SRAM), or a synchronous DRAM (SDRAM)) and a nonvolatile memory (e.g., a one-time programmable read only memory (OT-PROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 632 may be a solid state drive (SSD). The external memory 634 may include a flash drive, for example, compact flash (CF), secure digital (SD), micro-SD, mini-SD, extreme digital (xD) or a memory stick. The external memory 634 may be functionally connected to the electronic device 600 through various interfaces. According to an embodiment of the present disclosure, the electronic device 600 may further include a storage device (or a storage medium), such as a hard drive.

The sensor module 640 may measure a physical quantity or may detect an operation state of the electronic device 600.

The sensor module 640 may convert the measured or detected information to an electric signal. The sensor module 640 may include at least one of a gesture sensor 640A, a gyro sensor 640B, a pressure sensor 640C, a magnetic sensor 640D, an acceleration sensor 640E, a grip sensor 640F, a proximity sensor 640G, a color sensor 640H (e.g., red, green, blue (RGB) sensor), a living body sensor 640I, a temperature/humidity sensor 640J, an illuminance sensor 640K, or an ultraviolet (UV) sensor 640M. According to an embodiment of the present disclosure, the sensor module 640 may detect a left/right or up/down move gesture of a user. The detected information may be converted into an electrical signal, and the electrical signal may be used to move a cursor displayed on a screen.

Additionally or generally, the sensor module 640 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 640 may further include a control circuit for controlling at least one or more sensors included therein.

The input device 650 (e.g., the input module 110) may include a touch panel 652, a (digital) pen sensor 654, a key 656, or an ultrasonic input unit 658. The touch panel 652 may recognize a touch input using at least one of capacitive, resistive, IR and ultrasonic detecting methods. Also, the touch panel 652 may further include a control circuit. In the case of using the capacitive detecting method, a physical contact recognition or proximity recognition may be allowed. The touch panel 652 may further include a tactile layer. In this case, the touch panel 652 may provide a tactile reaction to a user.

The (digital) pen sensor 654 may be implemented in a similar or same manner as the method of receiving a touch input of a user or may be implemented using an additional sheet for recognition. The key 656 may include, for example, a physical button, an optical key, a keypad, and the like. The ultrasonic input device 658, which is an input device for generating an ultrasonic signal, may enable the electronic device 600 to sense detect a sound wave through a microphone (e.g., a microphone 688) so as to identify data, wherein the ultrasonic input device 658 is capable of wireless recognition. According to an embodiment of the present disclosure, the electronic device 600 may use the communication module 620 so as to receive a user input from an external device (e.g., a computer or server) connected to the communication module 620.

The display 660 (e.g., the display module 120) may include a panel 662, a hologram device 664, or a projector 666. The panel 662 may be, for example, an LCD, an active matrix organic light-emitting diode (AM-OLED), and the like. The panel 662 may be, for example, flexible, transparent or wearable. The panel 662 and the touch panel 652 may be integrated into a single module. The hologram device 664 may display a stereoscopic image in a space using a light interference phenomenon. The projector 666 may project light onto a screen so as to display an image. The screen may be arranged in the inside or the outside of the electronic device 600. According to an embodiment of the present disclosure, the display 660 may further include a control circuit for controlling the panel 662, the hologram device 664, or the projector 666.

The interface 670 may include, for example, a high-definition multimedia interface (HDMI) 672, a universal serial bus (USB) 674, an optical interface 676, or a D-sub-miniature (D-sub) 678. Additionally or generally, the interface 670 may include, for example, a mobile high definition link (MHL) interface, an SD card/multi-media card (MMC) interface, or an infrared data association (IrDA) standard interface.

The audio module 680 may convert a sound and an electric signal in dual directions. The audio module 680 may process, for example, sound information that is input or output through a speaker 682, a receiver 684, an earphone 686, or a microphone 688.

According to an embodiment of the present disclosure, the camera module 691 for shooting a still image or a video may include at least one image sensor (e.g., a front sensor or a rear sensor), a lens (not illustrated), an image signal processor (ISP, not illustrated), or a flash (e.g., an LED or a xenon lamp, not illustrated).

The power management module 695 may manage power of the electronic device 100. Although not illustrated, a power management IC (PMIC) a charger IC, or a battery or fuel gauge may be included in the power management module 695.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier, and the like.

The battery gauge may measure, for example, a remaining capacity of the battery 696 and a voltage, current or temperature thereof while the battery is charged. The battery 696 may store or generate electricity, and may supply power to the electronic device 600 using the stored or generated electricity. The battery 696 may include, for example, a rechargeable battery or a solar battery.

The indicator 697 may display a specific state of the electronic device 600 or a portion thereof (e.g., the AP 610), such as a booting state, a message state, a charging state, and the like. The motor 698 may convert an electrical signal into a mechanical vibration. Although not illustrated, a processing device (e.g., a GPU) for supporting a mobile TV may be included in the electronic device 600. The processing device for supporting a mobile TV may process media data according to the standards of digital multimedia broadcasting (DMB), digital video broadcasting (DVB) or MediaFlo™.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure may be, for example, implemented by instructions stored in a computer-readable storage media in the form of a programmable module. The instruction, when executed by one or more processors (e.g., a processor 610), may cause the one or more processors to perform a function corresponding to the instruction. The computer-readable storage media, for example, may be the memory 630. At least a portion of the programming module may be implemented (e.g., executed), for example, by the processor 610. At least a portion of the programming module may include, for example, modules, programs, routines, sets of instructions, or processes, and the like for performing one or more functions.

A computer-readable recording medium may include hardware, which is configured to store and execute a program instruction (e.g., a programming module), such as a hard disk, a magnetic media such as a floppy disk and a magnetic tape, an optical media such as compact disc ROM (CD-ROM) and a DVD, a magneto-optical media such as a floptical disk, and hardware devices such as ROM, RAM, and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a program module, or other elements according to an embodiment of the present disclosure may be executed sequentially, in parallel, repeatedly, or in a heuristic method. Also, a portion of operations may be executed in different sequences, omitted, or other operations may be added.

As described above, contents displayed on a screen may be outputted through a multi-dimensional spatial sound, thereby making it possible for a user to three-dimensionally perceive the displayed contents on the screen quickly.

Also, there may be transmitted a sound of which the intensity or frequency differentiates according to a location of a focused point, thereby making it possible for a user to easily learn the utilization of an electronic device.

Furthermore, contents actually displayed on a screen of an electronic device may be placed at a virtual space in which a blind person is able to perceive the sense of space easy to understand, thereby making it possible for a user to perceive the displayed contents through a sound quickly.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of outputting screen information using a sound, executed on an electronic device, the method comprising:
    creating a multi-dimensional space of two or more dimensions corresponding to a screen of the electronic device;
    setting sound information on respective coordinates of the multi-dimensional space;
    extracting location information of a focused point on the screen of the electronic device;
    determining coordinates of the multi-dimensional space corresponding to the location information; and
    outputting the sound according to the sound information set to the determined coordinates.

2. The method of claim 1, wherein the sound information comprises information perceived as one among a plurality of situations based on a relative distance between a specific point on the multi-dimensional space and the coordinates of the multi-dimensional space.

3. The method of claim 1, wherein the setting of the sound information comprises:
    setting sound information, which differentiates according to a relative distance between a specific point on the multi-dimensional space and the coordinates of the multi-dimensional space, to the respective coordinates using a pattern of a frequency change occurring at both ears of a user.

4. The method of claim 1, wherein the setting of the sound information comprises:
    creating the multi-dimensional space based on an intensity or a frequency of a sound; and
    assigning sounds in which at least one of an intensity or a frequency is variable, to the respective coordinates.

5. The method of claim 4, wherein the assigning of the sounds further comprises:
    differently setting an intensity or a frequency of a sound, which is changed while the sound is outputted, based on the coordinates of the multi-dimensional space.

6. The method of claim 1, further comprising:
    extracting an attribute of a target focused on the screen.

7. The method of claim 6, further comprising:
    setting sound information based on the extracted attribute of the target.

8. The method of claim 1, wherein the creating of the multi-dimensional space comprises:
    extending the screen of the electronic device up to a virtual space range.

9. The method of claim 1, wherein the setting of the sound information comprises:
    setting a sound preamble of a same characteristic to at least one of rows or columns in the multi-dimensional space.

10. The method of claim 1, wherein the setting of the sound information comprises:
    assigning to include number information of the coordinates in the sound information.

11. The method of claim 1, wherein the setting of the sound information further comprises:
    changing a tone and assigning the changed tone to the respective coordinates.

12. An electronic device comprising:
    at least one processor; and at least one memory storing computer program instructions that, when executed by the at least one processor, cause the at least one processor to:
- create a multi-dimensional space corresponding to a screen of the electronic device,
- set sound information on respective coordinates of a corresponding space,
- extract location information of a focused point on the screen of the electronic device,
- determine coordinates of the multi-dimensional space corresponding to the location information, and
- output a sound according to the sound information set to the determined coordinates.

13. The electronic device of claim 12, wherein the sound information comprises information perceived as one among a plurality of situations based on a relative distance between a specific point on the multi-dimensional space and the coordinates of the multi-dimensional space.

14. The electronic device of claim 12, wherein the at least one processor is further configured to set sound information, which differentiates according to a relative distance between a specific point on the multi-dimensional space and the coordinates of the multi-dimensional space, to the respective coordinates using a pattern of a frequency change occurring at both ears of a user.

15. The electronic device of claim 12, wherein the at least one processor is further configured to:
- create the multi-dimensional space based on an intensity or a frequency of a sound, and
- assign sounds in which at least one of an intensity or a frequency is variable, to the respective coordinates.

16. The electronic device of claim 15, wherein the at least one processor is further configured to differently set an intensity or a frequency of a sound, which is changed while the sound is outputted, based on the coordinates of the multi-dimensional space.

17. The electronic device of claim 12, wherein the at least one processor is further configured to extend the screen of the electronic device up to a virtual space range set by a user.

18. The electronic device of claim 12, wherein the at least one processor is further configured to set a sound preamble of a same characteristic to at least one of rows or columns in the multi-dimensional space.

19. The electronic device of claim 12, wherein the at least one processor is further configured to assign to include number information of the coordinates in the sound information.

20. The electronic device of claim 12, wherein the at least one processor is further configured to:
- change a tone, and
- assign the changed tone to the respective coordinates.

21. The electronic device of claim 12, wherein the sound information is determined based on the position of a user to the respective coordinates on the screen of the electronic device.

* * * * *